Patented Mar. 13, 1945

2,371,543

UNITED STATES PATENT OFFICE 2,371,543

SEPARATION OF AMMONIUM CHLORIDE AND ALIPHATIC AMINE HYDROCHLORIDES FROM MIXTURES OF THE SAME WITH COPPER CHLORIDE

Noland Poffenberger and Ray D. Holmes, Midland, Mich., assignors to The Dow Chemical Company, Midland, Mich., a corporation of Michigan No Drawing. Application February 14, 1944,
Serial No. 522,390

16 Claims. (Cl. 23—100)

This invention relates to a method of recovering ammonium chloride and/or aliphatic amine hydrochlorides and particularly to the recovery of the same from solutions containing copper chloride. This application is a continuation-in-part of and a substitute for our copending application, Serial No. 412,834, filed September 29, 1941.

Ammonium chloride and aliphatic amine hydrochlorides are frequently prepared industrially by combining ammonia or an aliphatic amine with hydrochloric acid. In addition, these compounds are formed incidentally to the manufacture of other products in some industrial processes. In some such cases they can be isolated in the form of an aqueous solution from which they can be recovered easily. In other processes, however, solutions of ammonium chloride together with copper chloride are obtained in large quantities. Such solutions have not heretofore been economical as sources for pure ammonia chloride due to the lack of a practical method for separating the copper chloride from the ammonium chloride. The solutions have usually been treated with alkalies, e. g., sodium hydroxide, to liberate ammonia and leave the copper as an insoluble oxide or hydroxide, or electrolyzed to recover metallic copper, or they have, in some instances, been treated with a sulfide such as hydrogen sulfide or ammonium sulfide to precipitate the copper as the sulfide. The first of these methods is disadvantageous in that it involves the consumption of alkali and results in destruction of the ammonium chloride. Although ammonium chloride may be recovered by the last two of said methods, they do not permit recovery of the copper chloride as such, but, instead, convert it into less valuable materials.

It is an object of this invention to provide a method whereby an aqueous solution comprising a copper chloride and a hydrochloride of ammonia or of an aliphatic amine may be treated to separate the copper chloride and said hydrochloride from one another.

This invention whereby the foregoing object is accomplished comprises bringing an aqueous solution containing ammonium chloride and/or an aliphatic amine hydrochloride and a copper chloride into contact with a monoaryl amine such as aniline, ortho-toluidine, para-toluidine, dimethylaniline, monomethylaniline, alpha-naphthylamine, etc., under conditions such that the copper chloride reacts with the monoaryl amine to form a complex compound which is substantially insoluble in the aqueous solution of the ammonium or aliphatic amine hydrochloride. The monoaryl amine may be used either in the form of the free base or as the hydrochloride. The complex compound which is usually crystalline, but which may form a liquid layer with an excess of the monoaryl amine, particularly when the latter is used as the free base, is separated. The remaining aqueous solution, containing the ammonium chloride or aliphatic amine hydrochloride, may be further treated in a suitable manner, e. g., with ammonium sulfide, to remove any remaining traces of copper and then be either crystallized or evaporated to recover substantially pure ammonium chloride or amine hydrochloride. The complex compound of copper chloride with the aryl amine does not form readily when the reaction mixture contains a substantial concentration of ammonia or alkyl amine in the free state. Accordingly, ammonia or alkyl amine if present in free form and in appreciable amount in the solution of the ammonium chloride and copper compound is removed, e. g., by vaporization, or neutralized with hydrochloric acid prior to the addition of the mono-arylamine.

Although the invention is applicable to the recovery of ammonium chloride and the hydrochlorides of the lower aliphatic amines, i. e., of aliphatic amines containing less than six carbon atoms, and although aromatic amines of the type described above, and their hydrochlorides, may be used to separate the copper chloride from the ammonium chloride or lower aliphatic amine hydrochloride, it will be particularly described with reference to the recovery of ammonium chloride and the use of aniline to effect the separation. This is only by way of example and not by way of limitation.

The reaction between the copper chloride, in which the copper may be present in the cuprous or the cupric state, or in both, and the aniline is preferably carried out by agitating together the aniline or its hydrochloride and the aqueous solution of ammonium chloride and copper chloride. Although the insoluble complex compound is usually most readily formed in the absence of free acids, its formation may also occur in some instances in the presence of substantial quantities of free acid, particularly when certain aromatic amines other than aniline are used. An amount of aniline is used corresponding, usually, to less than 10 mols of aniline for each mol of copper chloride in the solution. Larger amounts of aniline may be used, but the increase in efficiency of copper removal thus obtained will not ordinarily justify the expense of recovering such additional quantities of aniline. The completeness of the separation of copper from the solution decreases rapidly as the amount of aniline is reduced below 1 mol of aniline per mol of copper chloride initially present. The aqueous solution may be treated with successive portions of aniline or be continuously extracted by counter-current treatment with the aniline. When aniline hydrochloride is used, it may be added to the solution containing the ammonium and copper chlorides.

The temperature is preferably maintained below 60° C., but above the point at which ammonium chloride crystallizes from the solution. For convenience this lower temperature is hereinafter referred to as the crystallizing temperature. However, still lower temperatures may be employed, in which case it may be advantageous to wash, or otherwise treat, the separated complex compound to free it from crystals of ammonium chloride. The distribution of the copper between the aqueous and the aqueous-immiscible portions of the mixture varies with the temperature. At higher temperatures more of the copper is retained in the aqueous portion than at lower temperatures. Agitation of the mixture may be continued until the reaction has attained the desired degree of completion. This usually requires only a few minutes, e. g., from one to ten minutes, although the time depends somewhat upon the efficiency of the agitation. Inert organic liquids immiscible with the aqueous ammonium chloride, such as benzene or chlorobenzene, may also be added to the mixture in order to facilitate formation and separation of the mixture into layers. Both cupric and cuprous chlorides will react with aniline in the above manner to form complex compounds which are substantially insoluble in the ammonium chloride solution. However, in separating cuprous chloride from ammonium chloride, it may be desirable to carry out the reaction in the absence of oxygen or other oxidizing agent, e. g., under vacuum or in contact with a non-oxidizing atmosphere, to prevent oxidation of the cuprous copper.

After the reaction is complete, the oily aniline layer is separated from the aqueous layer in any suitable manner, e. g., by decantation or settling. Filtration may be resorted to in case crystals or lumps of the complex compound are present. The oily or solid product which contains the complex compound may then be treated in any of several ways for recovery of the aniline and the copper chloride, e. g., by heating to volatilize the aniline and leave the copper chloride as a residue.

The aqueous solution remaining after removal of the complex compound of aniline and copper chloride contains the ammonium chloride and may contain a very small amount of residual dissolved copper chloride which it is not economical to extract or precipitate with aniline. The solution may be treated in any one of a number of ways to obtain pure ammonium chloride. For instance, any aniline hydrochloride present may advantageously be decomposed with ammonia and dissolved aniline may be distilled or be extracted from the aqueous solution with a water-immiscible solvent, after which sufficient ammonium sulfide may be added to precipitate the copper as copper sulfide. However, the order of these operations may be varied, e. g., the dissolved copper may be precipitated with ammonium sulfide prior to removal of the aniline or, if desired, prior to decomposition of the aniline hydrochloride. After filtration to remove the copper sulfide so formed, the solution may be treated with activated carbon or a bleaching earth, if necessary, to remove any color present. The solution may then be concentrated to crystallize pure ammonium chloride, or it may be evaporated and, if desired, the residue may be further purified by sublimation or in any other convenient manner.

The following examples will serve to illustrate the principle of the invention, but are not to be construed as limiting its scope:

*Example 1*

1085 grams of an aqueous solution containing 52 grams (0.52 mol) of cuprous chloride and 165 grams (3.01 mols) of ammonium chloride is treated, in the absence of air, with 50 grams (0.53 mol) of aniline and 50 grams of benzene, and the mixture agitated vigorously at room temperature for two minutes. Upon standing, the mixture forms into an oily layer and an aqueous layer, which are separated. The aqueous layer is further treated twice in a similar manner with 100 gram portions of aniline and benzene. The three portions of aniline are combined and steam-distilled until the benzene and aniline are removed, leaving 50.9 grams (0.52 mol) cuprous chloride as a residue in the still. The oily layer of the distillate, which consists of aniline and benzene, is separated and used for subsequent recoveries of copper chloride. The extracted ammonium chloride solution, after distilling to remove traces of dissolved benzene and aniline, contains 0.4 gram of cuprous copper in solution. The solution is then treated with 0.215 gram of ammonium sulfide in aqueous solution, and the small amount of copper sulfide thus precipitated is removed by filtration. Upon evaporating the filtrate to dryness, there is obtained 159 grams (2.97 mols) of pure ammonium chloride.

*Example 2*

340 grams of an aqueous solution containing 13.1 grams (0.133 mol) of cuprous chloride, 5.4 grams (0.04 mol) of cupric chloride and 53 grams (0.53 mol) of ammonium chloride was agitated vigorously with 40 grams (0.425 mol) of aniline for two minutes. The mixture was then cooled to 10° C. and the solid complex compounds of cupric and cuprous chlorides with aniline were removed by filtering. The aqueous ammonium chloride solution collected as the filtrate contained only .23 gram of copper, calculated as metallic copper. More than 98 per cent of the copper chlorides originally present in the solution had been removed by the treatment with aniline.

*Example 3*

200 c. c. of a 15 per cent aqueous solution of dimethylamine hydrochloride containing 5.96 grams (0.06 mol) of cuprous chloride was shaken for one hour at ordinary room temperature with 17 grams (0.18 mol) of aniline and the insoluble portion of the mixture separated from the aqueous portion. The aqueous portion was analyzed and found to contain 2.3 grams (0.023 mol) of copper calculated as cuprous chloride. 92.5 per cent of the copper was thus removed from the solution by the treatment with aniline.

Other modes of applying the principle of the invention may be employed instead of those explained, change being made as regards the method herein disclosed, provides the step or steps stated by any of the following claims or the equivalent of such stated step or steps be employed.

We therefore particularly point out and distinctly claim as our invention:

1. In a method for separating from one another a copper chloride and a hydrochloride of a compound selected from the class consisting of ammonia and aliphatic amines containing less than six carbon atoms in the molecule, which are contained in an aqueous solution thereof that is substantially free of uncombined ammonia and aliphatic amines, the steps which consist in treating the solution with an aryl-amine compound selected from the class consisting of monoaryl amines and their hydrochlorides and separating from the solution the insoluble complex compound of the copper chloride and arylamine compound thereby formed.

2. In a method for separating from one another a copper chloride and a hydrochloride of a compound selected from the class consisting of ammonia and aliphatic amines containing less than six carbon atoms in the molecule, which are contained in an aqueous solution thereof that is substantially free of uncombined ammonia and aliphatic amines, the steps which consist in treating the solution with an aryl-amine compound selected from the class consisting of monoaryl amines and their hydrochlorides, separating from the solution an insoluble complex compound of the copper chloride and arylamine compound, concentrating the remaining aqueous solution and recovering therefrom said hydrochloride of a compound selected from the class consisting of ammonia and aliphatic amines containing less than six carbon atoms in the molecule.

3. In a method for separating from one another a copper chloride and ammonium chloride, which are contained in an aqueous solution thereof that is substantially free of uncombined ammonia, the steps which consist in treating the solution with an arylamine compound selected from the class consisting of monoaryl amines and their hydrochlorides, and separating from the solution a complex compound of the copper chloride and arylamine compound.

4. In a method for separating from one another a copper chloride and ammonium chloride, which are contained in an aqueous solution thereof that is substantially free of uncombined ammonia, the steps which consist in treating the solution with an arylamine compound selected from the class consisting of monoaryl amines and their hydrochlorides, separating from the solution an insoluble complex compound of the copper chloride and arylamine compound, treating the aqueous solution from which the complex compound has been separated with ammonium sulfide and removing precipitated copper sulfide.

5. In a method for separating from one another a copper chloride and ammonium chloride, which are contained in an aqueous solution thereof that is substantially free of uncombined ammonia, the steps which consist in treating the solution with aniline and separating from the solution an insoluble complex compound of the copper chloride and aniline.

6. In a method for separating from one another a copper chloride and ammonium chloride, which are contained in an aqueous solution thereof that is substantially free of uncombined ammonia, the steps which consist in treating the solution with aniline, separating from the solution an insoluble complex compound of the copper chloride and aniline, separating aniline from the resulting aqueous solution, treating the solution from which the aniline has been separated with ammonium sulfide, and removing precipitated copper sulfide.

7. In a method for separating from one another a copper chloride and ammonium chloride, which are contained in an aqueous solution thereof that is substantially free of uncombined ammonia, the steps which consist in treating the solution with aniline hydrochloride and separating from the solution an insoluble complex compound comprising aniline and copper chloride.

8. In a method for separating from one another a copper chloride and ammonium chloride, which are contained in an aqueous solution thereof that is substantially free of uncombined ammonia, the steps which consist in treating the solution with aniline hydrochloride, separating from the solution the insoluble complex compound comprising aniline and copper chloride thereby formed, treating the aqueous solution from which the complex compound has been separated with ammonia in amount sufficient to regenerate aniline from aniline hydrochloride remaining in the solution, separating the regenerated aniline from the solution, treating the solution from which the aniline has been separated with ammonium sulfide, and removing precipitated copper sulfide.

9. In a method for separating from one another cupric chloride and ammonium chloride, which are contained in an aqueous solution thereof that is substantially free of uncombined ammonia, the steps which consist in treating the solution with aniline, and separating from the solution the insoluble complex compound of cupric chloride and aniline thereby formed.

10. In a method for separating from one another cupric chloride and ammonium chloride, which are contained in an aqueous solution thereof that is substantially free of uncombined ammonia, the steps which consist in treating the solution with at least 1 mol of aniline for each mol of cupric chloride in the solution and separating from the solution the complex compound of cupric chloride and aniline thereby formed.

11. In a method for separating from one another cuprous chloride and ammonium chloride, which are contained in an aqueous solution thereof that is substantially free of uncombined ammonia, the steps which consist in treating the solution with aniline and separating from the solution the insoluble complex compound of cuprous chloride and aniline thereby formed.

12. In a method for separating from one another cuprous chloride and ammonium chloride, which are contained in an aqueous solution thereof that is substantially free of uncombined ammonia, the steps which consist in treating the solution with aniline, separating an insoluble complex compound of cuprous chloride and aniline, concentrating the remaining aqueous solution, and recovering ammonium chloride therefrom.

13. In a method for separating from one another cuprous chloride and ammonium chloride, which are contained in an aqueous solution thereof that is substantially free of uncombined ammonia, the steps which consist in treating the solution with at least 1 mol of aniline for each mol of cuprous chloride in the solution, and separating from the solution the insoluble complex compound of cuprous chloride and aniline thereby formed.

14. In a method for separating from one another cuprous chloride and ammonium chloride, which are contained in an aqueous solution thereof that is substantially free of uncombined ammonia, the steps which consist in treating the solution with at least 1 mol of aniline for each mol of cuprous chloride in the solution, separating from the solution an insoluble complex compound of cuprous chloride and aniline, concentrating the remaining aqueous solution, and recovering ammonium chloride therefrom.

15. In a method for separating from one another cuprous chloride and ammonium chloride which are contained in an aqueous solution thereof that is substantially free of uncombined ammonia, the steps which consist in treating the solution with between 1 and 10 mols of aniline for each mol of cuprous chloride in the solution while at a temperature between 60° C. and the crystallizing temperature of the solution, separating from the solution the insoluble complex compound of cuprous chloride and aniline thereby formed, treating the aqueous solution from which the complex compound has been separated with ammonium sulfide in amount sufficient to precipitate, as copper sulfide, traces of copper remaining in the solution, removing the precipitated copper sulfide, concentrating the resulting solution, and recovering ammonium chloride therefrom.

16. In a method for separating from one another cuprous chloride and ammonium chloride, which are contained in an aqueous solution thereof that is substantially free of uncombined ammonia, the steps which consist in treating the solution under non-oxidizing conditions with between 1 and 10 mols of aniline for each mol of cuprous chloride in the solution, and separating from the solution the insoluble complex compound of cuprous chloride and aniline thereby formed.

NOLAND POFFENBERGER.
RAY D. HOLMES.